United States Patent
Skiba et al.

(10) Patent No.: US 9,444,940 B2
(45) Date of Patent: Sep. 13, 2016

(54) PSEUDO AGENT MATCHING

(71) Applicant: Avaya, Inc., Basking Ridge, NJ (US)

(72) Inventors: David Skiba, Golden, CO (US); George Erhart, Loveland, CO (US); Lee Becker, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/085,464

(22) Filed: Nov. 20, 2013

(65) Prior Publication Data
US 2015/0139416 A1    May 21, 2015

(51) Int. Cl.
*H04M 3/00* (2006.01)
*H04M 3/523* (2006.01)
*H04M 3/51* (2006.01)

(52) U.S. Cl.
CPC ......... *H04M 3/5233* (2013.01); *H04M 3/5183* (2013.01); *H04M 2203/655* (2013.01)

(58) Field of Classification Search
CPC ..................... H04M 3/5233; H04M 3/5235
USPC ........ 379/265.01–265.14; 705/304, 706, 715
See application file for complete search history.

(56) References Cited

U.S. PATENT DOCUMENTS

| | | | | |
|---|---|---|---|---|
| 7,107,271 | B2* | 9/2006 | Aoki | H04H 60/31 |
| 8,069,125 | B2* | 11/2011 | Jung | A61B 5/04842 706/11 |
| 8,165,282 | B1 | 4/2012 | Coughlan et al. | 379/265.11 |
| 8,170,196 | B2* | 5/2012 | Knott | G06Q 10/06311 345/419 |
| 8,423,478 | B2* | 4/2013 | Finn et al. | 705/304 |
| 8,464,346 | B2* | 6/2013 | Barai | H04L 63/1433 380/200 |
| 8,654,964 | B1* | 2/2014 | Noble, Jr. | H04M 3/5158 379/265.01 |
| 8,761,377 | B2* | 6/2014 | Famous | 379/265.09 |
| 8,767,948 | B1* | 7/2014 | Riahi | G06N 99/005 379/265.02 |
| 8,793,317 | B2* | 7/2014 | Bellomo | G06Q 10/10 709/200 |
| 8,930,815 | B2* | 1/2015 | Moore | G06Q 10/109 715/706 |
| 2002/0029203 | A1* | 3/2002 | Pelland et al. | 706/12 |
| 2002/0095295 | A1* | 7/2002 | Cohen et al. | 704/275 |
| 2003/0028498 | A1* | 2/2003 | Hayes-Roth | G06N 99/005 706/17 |
| 2004/0101127 | A1* | 5/2004 | Dezonno | H04M 3/523 379/265.02 |
| 2005/0067802 | A1* | 3/2005 | Lambert | B60P 3/34 280/47.35 |
| 2005/0169453 | A1* | 8/2005 | Knott et al. | 379/265.02 |
| 2009/0119588 | A1* | 5/2009 | Moore | G06Q 10/109 715/706 |
| 2009/0150225 | A1* | 6/2009 | Knott et al. | 705/10 |
| 2009/0157323 | A1* | 6/2009 | Jung | A61B 5/0476 702/19 |
| 2009/0157482 | A1* | 6/2009 | Jung | A61B 5/04842 705/7.33 |
| 2009/0251457 | A1* | 10/2009 | Walker et al. | 345/418 |
| 2011/0150189 | A1* | 6/2011 | Kulkarni | 379/32.01 |
| 2012/0005106 | A1* | 1/2012 | Famous | 705/304 |
| 2012/0096352 | A1* | 4/2012 | Maor | H04L 51/32 715/706 |
| 2012/0150960 | A1* | 6/2012 | Nalawade | G06Q 30/02 709/204 |
| 2012/0166345 | A1* | 6/2012 | Klemm | G06Q 30/016 705/304 |
| 2012/0245963 | A1* | 9/2012 | Peak et al. | 705/4 |

(Continued)

*Primary Examiner* — William Deane, Jr.
(74) *Attorney, Agent, or Firm* — Sheridan Ross P.C.

(57) ABSTRACT

Contact centers employ agents to provide services to customers. In particular, artificial agents are provided that have a rich background and continuing life with the realm of social media. The artificial agent's profile is selected in accord with the profiles of current or prospective customers. As the customers age and progress in life, the artificial agent profile is updated in accord with the customers' changing profiles and similarly ages and progresses in life. When a customer desires to interact with artificial agent, for a purpose provided by a contact center, a human agent may be provided the profile and/or history of the artificial agent so as to impersonate the artificial agent and promote the relationship with the customer.

20 Claims, 4 Drawing Sheets

(56) References Cited

U.S. PATENT DOCUMENTS

| | | | | |
|---|---|---|---|---|
| 2012/0329561 A1* | 12/2012 | Evans | ............... | G06F 19/28 463/43 |
| 2013/0006874 A1* | 1/2013 | Klemm | ............... | 705/304 |
| 2013/0051547 A1* | 2/2013 | Chavez | ............... | 379/265.09 |
| 2013/0132230 A1* | 5/2013 | Gibson et al. | ............... | 705/26.8 |
| 2013/0231990 A1* | 9/2013 | Munjal et al. | ............... | 705/14.23 |
| 2013/0262320 A1* | 10/2013 | Makanawala et al. | ............... | 705/304 |
| 2013/0262332 A1* | 10/2013 | Moon et al. | ............... | 705/319 |
| 2014/0036022 A1* | 2/2014 | Croen | ............... | H04N 7/147 348/14.01 |
| 2014/0036023 A1* | 2/2014 | Croen et al. | ............... | 348/14.01 |
| 2014/0074589 A1* | 3/2014 | Nielsen et al. | ............... | 705/14.43 |
| 2015/0207937 A1 | 7/2015 | D'Arcy et al. | | |
| 2015/0207938 A1 | 7/2015 | Shaffer et al. | | |
| 2015/0356446 A1* | 12/2015 | Greystoke | ............... | G06N 5/045 706/11 |

* cited by examiner

PSEUDO AGENT MATCHING

FIELD OF THE DISCLOSURE

The present disclosure is generally directed toward communications and more particularly toward contact centers.

BACKGROUND

Many industries are evolving today to keep on pace with new methods of communication. Businesses consider how and why customers use social media and how it can positively or negatively affect their business. Businesses also consider how to reach and communicate with customers through social media interactions in addition to traditional advertising and marketing. It is important to provide high quality products and good customer service, but it is also becoming increasingly important to participate in social media banter. This is particularly critical for companies that serve a social need, like clothing stores and other retailers.

A current trend in social interactions is that customers want to feel like they are talking to a person, not a company. Communication strategies increasingly consider the desires and attributes of customers and how to match those with similar agents for the greatest possible synergy and potential for sales and customer satisfaction. However, there may not always be real agents who are great matches for the customers and/or agents with the desired attributes.

SUMMARY

It is with respect to the above issues and other problems that the embodiments presented herein were contemplated.

Certain embodiments disclosed seek to create dynamic pseudo-agents that change over time as a system analyzes the company's social media interactions with its customers. The dynamic pseudo-agents are cheaper to "evolve" than hiring a new set of agents to service a certain population of customers and these pseudo-agents can continuously be updated to give the illusion that the customer is getting and continues to get the best agent possible using the evolution of the pseudo-agent and intelligent routing.

One of the ways companies have tried to personalize agent interactions with customers is through the use of virtual advertising and avatars. The virtual advertising and the virtual avatars can be matched with customer attributes to create a strong visual and informational representation, personalized for the customer. This solution works well with young audiences when a live agent is not required. The growing trend is that customers want to feel like they are talking to a person and not just to a company. A different solution is needed when a live agent is engaged for an interaction with a customer.

In one embodiment, a customer is matched with a fake person, an invented persona or pseudo-agent, which is similar to the customer and/or has a persona with whom the customer may desire to or prefer to interact with. When the customer is on a social media website, such as Twitter, LinkedIn, or Facebook, he or she may be able to find pictures and posts from the fake person. The fake person would participate in social banter and comment on products, services, interests, etc. Similar to television commercials and other media that use actors to endorse products and/or represent a demographic, the invention creates and uses the "fake" personas to match the desires of customers.

In another embodiment, the fake persona could be used for outgoing campaigns, advertisements, etc. to make callers feel like they are calling a familiar friend.

For example, a clothing company might sell apparel and other items for a university's basketball team. "Beaver Fever" shirts, hats, foam fingers, mugs, and other Beaver fan items can be ordered from a contact center. Beaver fans are young and very active college students, using social media to comment on many aspects of the team, including memorabilia. The company would use Kelli, a fake person, to respond to and interact with Beaver fans that could look and see tweets, posts, and pictures of Kelli in her Beaver Fever garb. Rather than the contact center assigning an actual attribute set, the pseudo-agent Kelli would be based on analysis of Beaver Fever interactions every day, week, and/or month. "Kelli" would be dynamic, ready, and aware of any customer's full history as the system scans and matches posts, user IDs, customer orders, etc. and correlates them in a database, ready to present the data when the customer calls in.

When Jim calls in to order a Beaver Fever jersey, the system is operable to route Jim to a female agent. It also knows based on previous social interaction that Jim posts comments on Kelli's pictures. The call is routed to Leslie, a real agent who is female and approximately the same age as the fake agent. A pop-up is provided to brief Leslie so that she can pretend to be Kelli, the Beaver fan who is excited to take Jim's order. Leslie is presented Kelli's information, posts, and pictures as well as Jim's order history and Jim's most recent posts. The aggregated information allows Leslie to provide Jim a warm and personalized buying experience. Leslie can make recommendations based on Jim's social media comments, providing personalized suggestions for purchase.

Leslie, as Kelli, might say, "You know, Jim, the black jersey with the orange lettering will look really nice with the orange hat you bought last time. I noticed that you and Angie are now in a relationship. How exciting! Do you need a shirt for her to wear to the game on Saturday, too?" Jim is so pleased that he is getting such personalized care that he orders a shirt for Angie and two foam fingers in addition to his own jersey. Leslie is happy as she's had a fun conversation with Jim and upsold the call by three items. The company is happy as sales climb in response to the pseudo-agent effect.

In one embodiment, a fake persona is created and maintained. For authenticity, the personas must be created, managed, and grown over time. An online persona without any history can be identified quickly as non-authentic and not trustworthy. Certain embodiments herein provide for monitoring, classifying, and suggesting areas where the fake persona should be created and when the fake persona should be created. In a further embodiment, additional manual processes may be incorporated in the creation of the fake persona to ensure it is appropriate for the social media site and has believable and relevant background information. Once created, the fake persona has a living history of activity. In a still further embodiment, notification is provided to real agents who use the model persona to update/add posts and/or activities.

In a second embodiment, one or more real agents are identified to use the fake persona. The agent will have a new skill that indicates what he or she is good at impersonating. For example, a 50 year old male agent has the best skills to use the 20 year old male college student persona for responses so appropriate work items are routed to him first.

In another embodiment, matching and routing is provided to make use of the persona. In this case the rules will change over time and with other attributes. A persona may start as a teenager but a few years later evolve to be used for a slightly older demographic as it "grows up." This requires that the routing analysis be dynamic to take into account how the persona is used for responses.

In one embodiment, a method is disclosed, comprising: accessing a customer profile with at least one customer attribute; determining a preferred agent attribute in accord with the customer profile; creating a pseudo-agent having a pseudo-agent profile with a first pseudo-agent profile attribute; and setting the first pseudo-agent profile attribute in accord with the preferred agent attribute.

In another embodiment, a system is disclosed, comprising: a processor; a database; a network connection operable to connect the processor to a social media website; and wherein the processor is operable to access the database to retrieve a customer profile with at least one customer attribute, determine a preferred agent attribute in accord with the customer profile, create a pseudo-agent having a pseudo-agent profile with a first pseudo-agent profile attribute; and set the first pseudo-agent profile attribute in accord with the preferred agent attribute.

In yet another embodiment, a non-transitory computer readable medium is disclosed with instructions that, when read by a computer, cause the computer to perform the following method: accessing a customer profile with at least one customer attribute; determining a preferred agent attribute in accord with the customer profile; creating a pseudo-agent having a pseudo-agent profile with a first profile attribute; and setting the first profile attribute in accord with the preferred agent attribute.

The term, "attribute," as used herein, means an aspect of a customer and/or a pseudo-agent. A customer may be an individual or group who has made a past purchase or who may purchase, use, and/or recommend goods or services in the future or, such as in the case of political issues, endorse a particular campaign or issue. Attributes may include demographic information, hobbies and interests, past purchases, real world and social media relationships, and/or other aspects of human life which.

The term, "pseudo-agent," as used herein refers to a fabricated person having profile with at least one attributes. The pseudo-agent, as it may exist in a social media website, may have a history, opinions, likes, events, connections, or other aspect of, what may be considered, life within the social media website and/or the real world as represented in social media. The pseudo-agent has at least one attribute which is selected in accord with a customer, such as to match an equivalent attribute of the customer or to create an affinity between the target customer and the pseudo-agent. The pseudo-agent may also appear to be employed in a role, such as an agent of a contact center. A customer may communicate with the pseudo-agent, in its role as contact center agent, for a particular purpose, for example to purchase a particular item. The pseudo-agent may provide additional and/or alternative services to the customer based on the pseudo-agent's social media presence and/or the customer's social media presence. The pseudo-agent, as it exists in the contact center, may be an artificial person or a human agent impersonating the pseudo-agent.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Certain systems and methods of this disclosure will also be described in relation to analysis software, modules, and associated analysis hardware. However, to avoid unnecessarily obscuring the present disclosure, the following description omits well-known structures, components and devices that may be shown in step diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
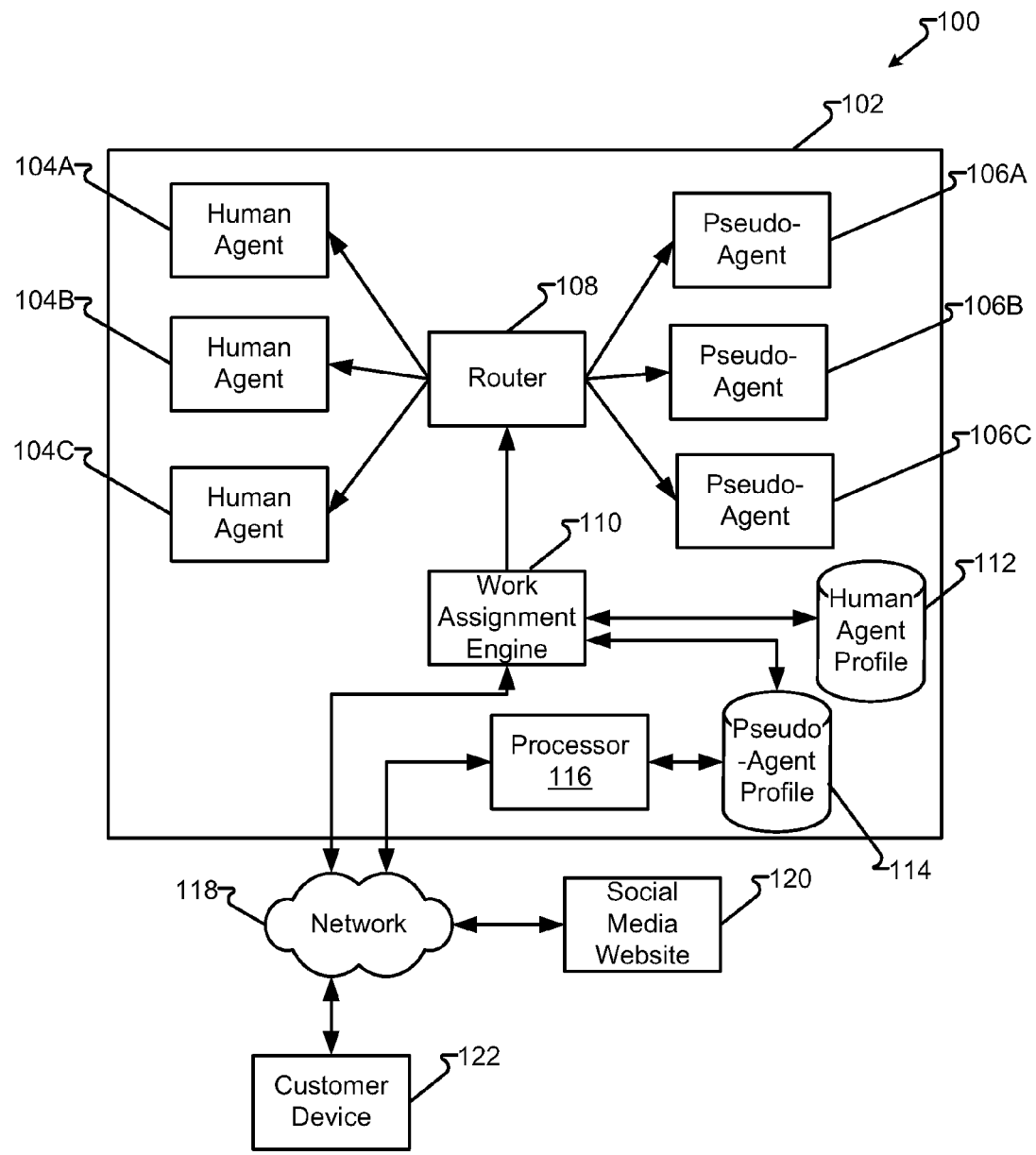
FIG. 1 depicts a system diagram in accordance with embodiments of the present disclosure.

With reference now to FIG. 1, a system for creating and maintaining a pseudo-agent will be described in accordance with embodiments of the present disclosure. Contact center 102 provides a number of agents, including human agents 104 and pseudo-agents 106, for the processing of customer work items associated with a customer (e.g., "contacts").

In one embodiment, pseudo-agents' 106 have profiles maintained on social media website 120 and/or pseudo-agent profile database 114. Processor 116 accesses pseudo-agent profile database 114 to populate and/or retrieve data to/from social media website 120, via network 118. Pseudo-agent profile database 114 may be populated by human and/or automated means. For example, contact center 102 may wish to have a pseudo-agent fitting a certain profile, with respect to some attributes, which may be populated manually (e.g., a narrative of the pseudo-agent's thought of a movie). Certain other attributes may be assigned by processor 116 (e.g., name, age, and gender). The assignment of attributes by processor 116 may be made in coordination with other pseudo-agents. For example, having a number of pseudo-agents 106 whereby each of the pseudo-agents 106 has an attributes fitting a particular category (e.g., fifty agents, one from each state in the United States). Processor 116 may also select some items randomly, such as those attributes which may only provide depth to the background for a pseudo-agent 106 (e.g., a city visited as a child).

In a further embodiment, processor 116 may access social media website 120 to retrieve updates therein and apply those update to pseudo-agent profile database 114. Similarly, updates within pseudo-agent database 114 may be applied to social media website 120. For example, a pseudo-agent in social media website 120 received a connection request (e.g., a "friend" request in Facebook, a "link" request in LinkedIn, etc.) or an endorsement (e.g., a "like", share, etc.) of a prior posting. The update may then be added to pseudo-agent profile database 114. In another example, it may be determined that a pseudo-agent 106 should create a post and post the event accordingly. Pseudo-agent profile database 114 is updated and processor 116 then populates the event in social media website 120. The content of social media website 120 may be maintained solely on social media website 120 or duplicated, in whole or in part, in pseudo-agent database 114. However, certain advantages may be realized if pseudo-agent profile database 114 has additional information, as proprietary information related to the purpose of the pseudo-agent, performance metrics, acceptable human agent 104 impersonators, and so on. For example, pseudo-agent 106A may have a defined profile age in social media website 120 whereas pseudo-agent profile database 114 may also include a range of ages deemed appropriate for human agent 104 in order to acceptably impersonate pseudo-agent 106A.

In another embodiment, a customer has a prior relationship with pseudo-agent 106A. The prior relationship may be based upon interactions in social media website 120, prior interactions, recommendations, or other connection. The customer, using customer device 122 connects to contact center 102 via network 118. Customer device 122 may be any device operable to communicate with contact center 102, such as a device operable to send and receive a text message, email, video-chat, telephone, etc. Accordingly, network 118 may be one or more of public-switched telephone network, Internet, Intranet, cellular network, etc.

The contact is received by work assignment engine 110 which then determines which agent, of human agents 104 and/or pseudo-agents 106, should be assigned the task of responding to the contact. Work assignment engine 110, may determine that the contact is requesting, or is associated with, a particular pseudo-agent 106, such as pseudo-agent 106A. Pseudo-agent 106A may have certain autonomous functionality and be able to respond to the contact without human intervention. Therefore, work assignment engine 110 may assign the task to pseudo-agent 106A and not to a corresponding one of human agents 106. Alternatively, work assignment engine 110 may determine that the contact cannot be handled by pseudo-agent 106A alone and determines one of human agent 104 should also receive the contact. Work assignment engine 110 may access pseudo-agent profile database 114 and human-agent profile database 112 and select the target pseudo-agent, in this case pseudo-agent 106A, and one of human agents 104. The selection of the human agent is made, in part, according to a match, or a match within an acceptable tolerance, with the corresponding pseudo-agent profile. Work assignment engine 110 may further select one of human agents 104 based upon the agent's availability or other aspect of contact center 102 operations. Continuing the example, human agent 104C may be available and an acceptable match to pseudo-agent 106A. Work assignment engine then causes router 108 to route the contact to pseudo-agent 104 and human agent 104C.

In another embodiment, human agent 104C is presented with information on pseudo-agent 104A, such as from pseudo-agent profile database 114 and/or social media website 120. Human agent 104C may then impersonate pseudo-agent 104A and respond to the contact accordingly. For example, human agent 104C may leverage pseudo-agent's 106A connection to the contact in social media website 120 to provide additional or alternative services and/or to further build rapport with the customer. In a further embodiment, processor 116 and/or work assignment engine 110 may update the profile of pseudo-agent 106A in pseudo-agent profile database 114 and/or social media website 120 in response to the contact.

While the description of the forgoing embodiment is primarily directed towards in-bound contacts, out-bound contacts may be implemented in a like manner. In one embodiment, work assignment engine 110 determines a contact is to be originated. Work assignment engine 110 accesses pseudo-agent database 114 and determines pseudo-agent 106B should send a message to a customer. Pseudo-agent 106B may be fully automated to perform a particular task, such as selecting one of a number of previously defined email or text messages to send. In other embodiments, human intervention is incorporated. Accordingly, work assignment engine accesses human agent profile 112 and determines human agent 104A should initiate the contact impersonating pseudo-agent 106B. Human agent 104A then initiates the contact by connecting to network 118 (connection means not shown) to contact a customer on customer device 122 and thereby establishing a communication session to process the out-bound contact.

Figure 2:
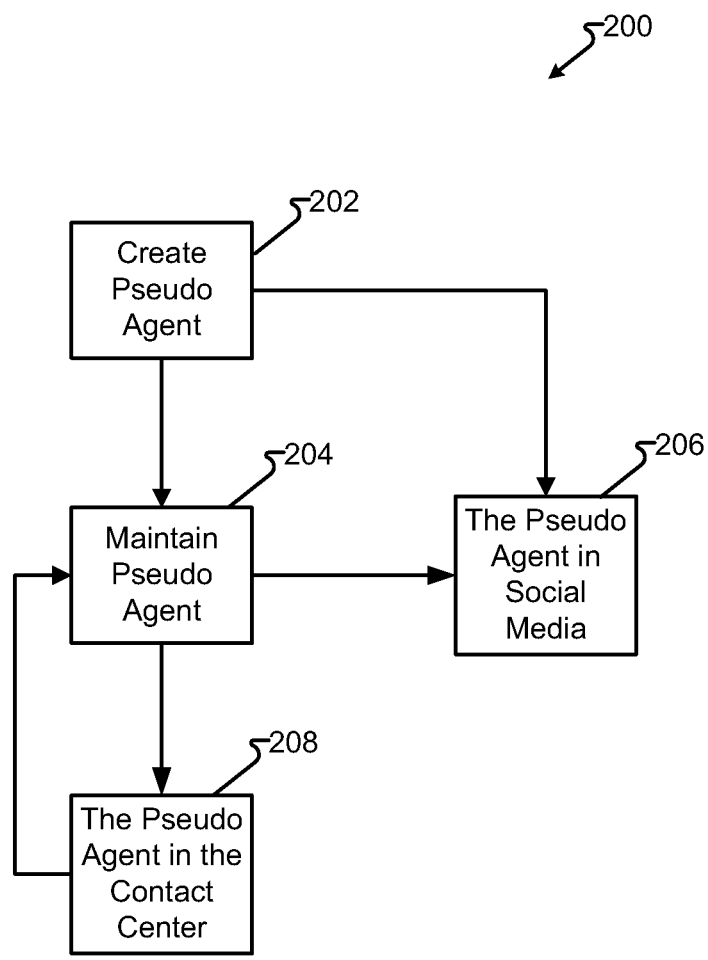
FIG. 2 depicts modules for creating and maintaining a pseudo-agent in accordance with embodiments of the present disclosure.

With reference now to FIG. 2, modules for creating and maintaining a pseudo-agent will be described in accordance with embodiments of the present disclosure. Module 102 creates the pseudo-agent and may be executed as a function of processor 116. In one embodiment, the pseudo-agent to be created is determined to have a profile that is similar to a particular set of customers. For example, a set of customers interested in purchasing fishing equipment and who relate best with agents who also fish. In another embodiment, the pseudo-agent profile is determined based on a perceived affinity to a profile for a set of customers. For example, a set of customers who are interested in learning how to ski or snowboard may be more comfortable with agents who have skied or snowboarded for many years. Contact centers rarely find sufficient human personnel to provide all the background profiles desired by its various customers. By creating pseudo-agents 106, by module 202, nearly any number of artificial agents having any profile attributes desired may be created. While creating pseudo-agents with a rich history and background may have certain advantages, module 202 may create a pseudo-agent with a profile that is substantially empty and comprises only the essential information to exist on a social media website.

In another embodiment, module 106 presents the pseudo-agent as a profile on one or more social media websites. The social media websites may take many forms and may include general purpose social media sites (e.g., Facebook, LinkedIn, Twitter, Google+, etc.), a corporate message board, a common interest website/message board, an individually operated website, a media based social media site (e.g., Vine, YouTube, etc.), and/or other website operable to host user accounts, display user profiles, receive posts from users, and/or receive endorsements from users (e.g., likes, shares, re-Tweets, etc.).

In another embodiment, module 204 maintains the pseudo-agent. Module 204 may be implemented as a function of processor 116. Human users of social media may find it difficult to relate or trust another user of social media who does not have an appropriate level of activity, such as a posting frequency. Once module 202 creates a pseudo-agent profile, module 204 may immediately, upon the passage of time, and/or periodically maintains the pseudo-agent profile. For example, module 202 may have created a pseudo-agent who is twenty-two years old, single, and enjoys backpacking trips that last for several days or even weeks. The pseudo-agent may have a number of connections to customers who relate to the pseudo-agent, because they participate in, or have an interest in, backpacking Ten years later, the pseudo-agent and customers have all aged. For many of the customers, family and work obligations have made weeklong backpacking trips a thing of the past. While some customers may have given up backpacking altogether, others may have downscaled, such as by taking fewer backpacking trip and/or shorter duration trips. Others may have switched to other outdoor activities more conducive to family participation (e.g., bicycling, canoeing, day hikes, etc.). If the pseudo-agent is to remain relevant and relatable to the customers, it has to transition as well. Updates may then be provided by social media pseudo-agent profile module 206 whereby an evolving pseudo-agent is maintained.

In another embodiment, pseudo-agent maintenance module 204 accesses the social media site to determine the activities and transitions the connections and/or target customers are experiencing and updates the pseudo-agent profile accordingly. The agent may have friends, followers, or other connections in social media with visible profiles. Those profiles may be examined to see if the pseudo-agent profile is still relatable. For example, shortly after being created by module 202, the pseudo-agent's connections may have been mostly unmarried. As time passes, the profiles of those connections may be examined and determined if there is a change and, if so, how the pseudo-agent's profile should also be changed. In another embodiment, module 204 may utilize external data, such as weather information, to create tasks to maintain the pseudo-agent's profile. For example, module 204 may cause the pseudo-agent to post, "I hope no one got caught in that thunderstorm last weekend." In yet another embodiment, module 204 may simply create "banter," which may do no more than show others that the pseudo-agent is active (e.g., "Happy New Year everyone," "Can't wait for the weekend," etc.).

In one embodiment, the pseudo-agent exists in the social media website 120 and not within contact center 102. The pseudo-agent may provide information to promote the interests of contact center 102 (e.g., "Tried out my new XYZ mountain bike last weekend. Loved it!", "Need new rain gear. I saw some from ABC Sporting Goods that looked good."). The customer may then be directed towards contact center 102 by an explicit statement (e.g., "Call 888.555.0000 or go to website.com if you want a pair for yourself"). However, in another embodiment, the pseudo-agent may also have a presence in contact center 102 whereby the pseudo-agent's social media profile may provide services in module 208. The pseudo-agent's profile may identify the pseudo-agent as an employee of contact center 102 and/or provide the means for the pseudo-agent to be contacted. Even more specifically, the pseudo-agent may explicitly provide their contact information on their profile or a posting (e.g., "pseduo-agent123@contactcenter.com", "If you like my new boots, call me at 888.555.0000 x0001 and I can order you a pair.) Module 208 may be a function of work assignment engine 110, router 108, pseudo-agent database 114, processor 114, pseudo-gents 106, human agents 104, and/or other components within or accessible to contact center 102. In certain communications, such as emails and texts, a computer generated message or response to a customer message may be possible. Messages may be generated by computer logic or selected from a pool of previously created message candidates, copied from another social media posting, or other source.

In another embodiment, module 204 provides updates in the form of profile embellishments. Embellishments may be an addition, change, or other aspect of a social media profile and include posts, comments, and endorsements and may further comprise text, images, photographs, videos, and/or audio files.

In another embodiment, the pseudo-agent may need to respond more accurately and/or more promptly, such as in a voice communication with a customer. Module 208 provides the profile, social media posts, or other content to a human agent, such as one of human agents 104, to impersonate the pseudo-agent, such as one of pseudo-agents 106, in a contact center session. Following the session, module 208 may cause module 204 to maintain the pseudo-agent profile with information based on the session. For example, posting on the recent interaction with the customer.

Figure 3:
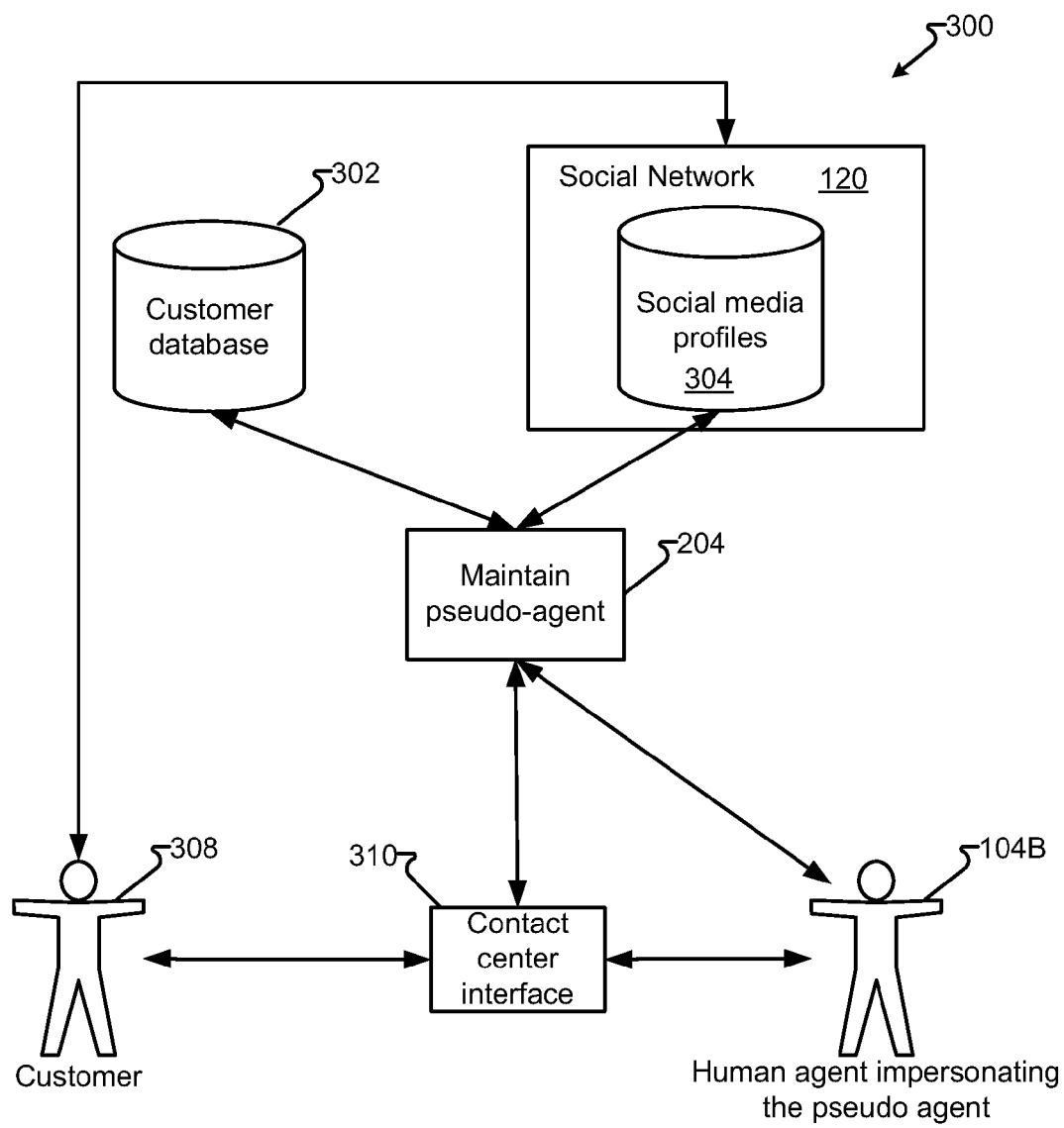
FIG. 3 is an operation diagram for a pseudo-agent in accordance with embodiments of the present disclosure.

With reference now to FIG. 3, operation diagram 300 for a pseudo-agent will be described in accordance with embodiments of the present disclosure. In one embodiment, system 300 determines at least a portion of the contents of the profile attributes for a pseudo-agent. Customer database 302 provides a source of customer purchases, geographic information, and/or other demographic information. One or more customers may also have profiles in social media profile database 304 of social network 120. One or more entries in customer database 302 may then be compared to associated entries in social media profile database 304. The purpose of the pseudo-agent may be a matter of implementation choice. One implementation choice may be to develop sales for a particular product or set of related products. Therefore, if customer database 302 and social media profile database 304 reveal that past purchasers of a given product have a common attribute, or an attribute that occurs more often than a threshold occurrence, then the pseudo-agent may be developed to include that attribute in its profile.

For example, a contact center is trying to develop sales of hiking shoes. Customer database 302 provides a list of past purchasers of hiking shoes. In one embodiment, examining customer database 302 may be sufficient. For example, if past purchasers are overwhelmingly from mountainous states, then the pseudo-agent may include attributes that include living in, or frequently visiting, states with mountainous terrain. Certain customer information may be available in social media profile database 304. Therefore, the profiles of a number of past customers may be matched to profiles in social media profile database 304. Social media profile database 304 may provide additional information, such as marital status, occupation, and so on. In one example, known data mining techniques are utilized and discover that thirty percent of the customers who bought hiking boots had social media profiles that included a profile attribute associated with scuba diving. A threshold may be established whereby if the percentage of profiles having an attribute is below the threshold, the attribute may be considered random, general, or otherwise not reasonably calculated to build customer affinity with the pseudo-agent and the attribute omitted or included as a generic attribute. As a result, the pseudo-agent, who's objective is promote and sell hiking boots, may have certain profile attributes associated with scuba diving.

A pseudo-agent may spend some time being developed on social network website 120. Connections can be made, banter provided for various topics, endorsements provided which may or may not include any aspect of the contact center's purpose for the pseudo-agent. At a later time, the pseudo-agent may then begin a contact center operation, such as to promote a particular task of the contact center. Generic comments, which may be customized for a particular audience, may also be provided. Such comments may be generated in advance and selected for occasional postings. For example, a post of, "who will win the superbowl," if timed correctly, may generate interest in the post and promote affiliation with the pseudo-agent.

In another embodiment, module 202 may create a social media pseudo-agent profile and establish an account in social media profile database 304. The pseudo-agent may be created with generic demographic information (e.g., name, age, sex, location, profession, etc.) to further embellish the background and maintained by module 204. To continue the example above, the profile may include a picture, comment, or other reference to hiking and scuba diving. Future embellishment may include endorsements of another's post regarding hiking or scuba diving. In a further embodiment, a certain amount of unrelated topics may be used to embellish the pseudo-agent's profile provided by module 204. For example, humans who like to hike and scuba dive may still post comments on cars, upcoming holidays, weather, family, and other aspects of human life. Therefore, module 204 may maintain the pseudo-agent by similarly selecting a certain number of unrelated topics to post or endorse, or otherwise embellish the profile of the pseudo-agent.

In another embodiment, customer 308 contacts the contact center via contact center interface 310, which may be a text messaging, voice, email, video chat or other communication interface. Contact center interface 310 may be a telephone system, email address, chat interface, text address, or other means by which contact center 102 may appear to customer 308.

In a first embodiment, customer 308 is unknown to the contact center 102. Contact center 102 may route the contact, via work assignment engine 110 and router 108, to human agent 104B. During or after the interaction between customer 208 and human agent 104B, the customer may be provided with information on how to access the social media profile of at least one pseudo-agent 106. For example, human agent 104B may say, "I've placed your order for your hiking shoes. Where are you going to try them out?" Customer 308 responds and human agent 104B replies, "I wish my co-worker (name of pseudo-agent) was here today. He is really into hiking and I think he has been to that area before. You should check him out his page on (name of the social network website)." Human agent 104B may then provide information on how to access the pseudo-agent, such as pseudo-agent 106B, via contact center 102 and/or social network website 120.

In a second embodiment, customer 308 is known to contact center 102, such as by a previous interaction with contact center 102 which served to identify customer 308, such as via caller identification ("caller-ID"), IP address, or other means. The contact associated with customer 308 is then routed to a selected pseudo-agent 106, which may entail routing the contact to human agent 104B impersonating pseudo-agent 106B. Customer 308 may not be explicitly known, but via a past experience, a friend, or by visiting social network website 120, customer 308 may acquire the ability to request a particular pseudo-agent, such as pseudo-agent 106B. For example, customer 308 may know a telephone number, extension, email address, other means by which a communication with pseudo-agent 106B may be established. Therefore, even if the customer 308 is unknown but self-selects pseudo-agent 106B, customer 308 may be associated with pseudo-agent 106B and routed accordingly.

While certain automated interactions may not be possible, human agent 104B may be utilized to impersonate pseudo-agent 106B. Human agent 104B may be presented with information, such as from social network website 120 so as to better perform the impersonation. When an automated response is utilized, the response may be sent to human agent 104B or other personnel for approval. In another embodiment, human agent 104B may formulate a message to be modified by pseudo-agent 106B. For example, customer 308 may have certain preferences, such as to interact with someone of a similar age, and pseudo-agent 106B modifies or recommends changes to the message such that it is age-appropriate for customer 308.

In another embodiment, human agent 104B may access a profile for customer 308 in social media profiles 304. This could be done to build rapport with the client, look for opportunities to up-sell, and/or other purposes.

At some point, generally after the interaction between customer 308 and human agent 104B, human agent 104B may be prompted for information useful to module 204 to maintain the pseudo-agent. For example, if customer 308 wishes to establish a connection with pseudo-agent 106B in social network website 120, human agent 104B may be prompted to initiate or accept such a request on behalf of pseudo-agent 106B. In another example, human agent 104B may provide a post including an artifact of the interaction with customer 308. The artifact may be in accord with the purpose of the interaction (e.g., posting, "Enjoy the new hiking boots" on customer's 308 profile), a future interaction (e.g., "I forgot to mention that we may have backpacks on sale soon. Be sure to check back."), or simply banter that acknowledges the interaction (e.g., "Good talking with you today") or reminds customer of pseudo-agent 106B. As an advantage, the social media profile maintained by module 204 may appear more interactive and timely.

Figure 4:
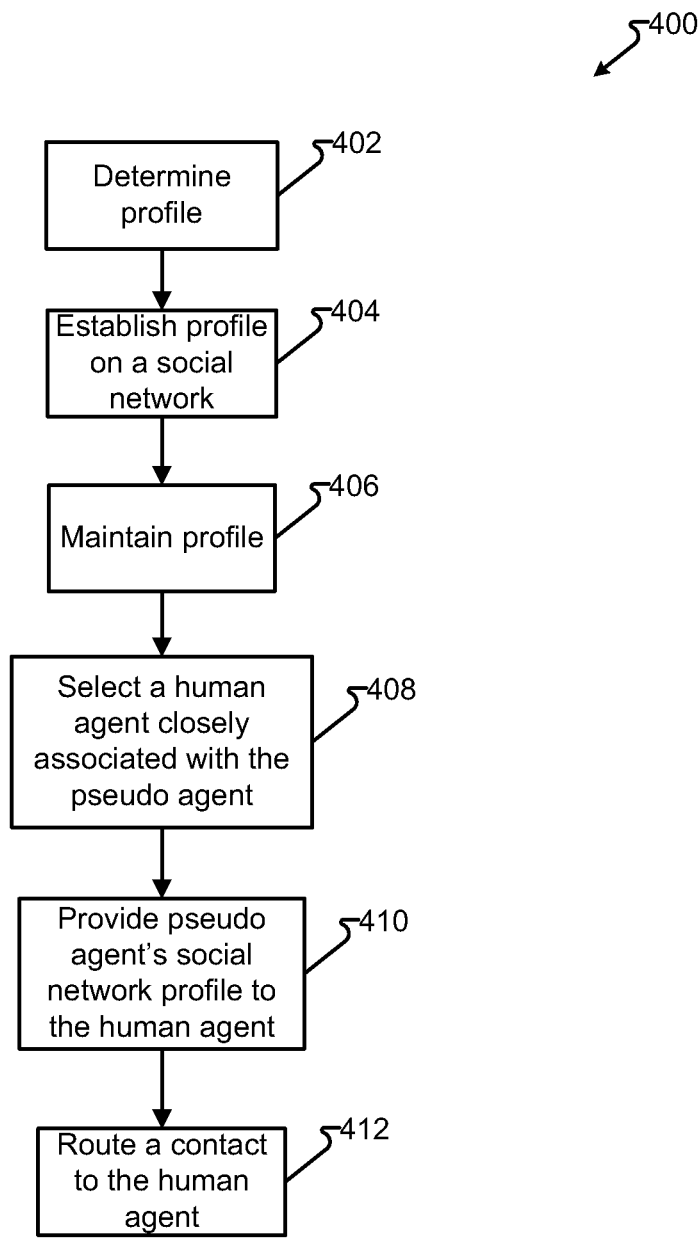
FIG. 4 depicts a process of selecting, maintaining, and routing to a pseudo-agent backed by a human agent in accordance with embodiments of the present disclosure.

With reference now to FIG. 4, a process 400 for operating a contact center will be described in accordance with embodiments of the present disclosure. Step 402 determines a profile for a pseudo-agent. The profile may be selected to be similar to a target customer or have attributes desired by the customer. For example, a customer may prefer to buy clothing from someone of the same or similar age, gender, and body type as the customer. In another example, one may prefer to buy smoking cessation products from a former smoker. It should be noted that what the customer prefers may be an estimation by contact center 102 or other entity. The profile may include other attributes associated with the profile. One associated attribute is the frequency of postings and the location of postings. For example, if the target audience posts three times a week, the pseudo-agent can similarly be programmed to post three times a week. As can be appreciated, a certain degree of randomness may be injected so as to not be too predictable and appear less machine-like. Another profile attribute may be the particular website in which the profile will reside. For example, YouTube may be more prominent for individuals who do extreme skiing so they can post videos of their activities. However, LonelyPlanet may be a more appropriate social network for world travelers.

Step 404 then creates the social media profile according to the determination of step 402. Over time step 406 maintains/updates the profile in the form of contributions (e.g., posts, comments, etc.), endorsements (e.g., likes, shares, re-tweets, etc), connections (e.g., accept and request friends, links, etc.), and personal events (e.g., activities participated in, relationship news, random thoughts, etc.). Step 406 may be performed continuously or at discrete intervals of time, such as what would be appropriate for the pseudo-agent's profile. For example, if the pseudo-agent's profile, in matching with a target demographic, would post five times a week to a particular social media website, then the pseudo-agent may then similarly post five times a week. As a benefit, the pseudo-agent would progress through life and age and change to stay relevant to the target customer. If the pseudo-agent is loses relevancy to the target customer, such as a clothier who sells to the youth market utilizing a first pseudo-agent who has now grown up. Accordingly, a second pseudo-agent may be created and similarly cultivate the next generation.

Once a pseudo-agent has been established, customer may contact the contact center to interact with an agent of the contact center. The customer may contact the contact center in a number of ways. For instance, the customer may create and post a social media interaction at a social network website 120. As a result of creating this social media post, the contact center may become aware of the customer's post and determine that a response is desired and/or required. Alternatively or additionally, the customer may direct a posting to a contact center (e.g., via a social media posting on the social media page of the enterprise hosting the contact center) or by contacting the contact center directly. Step 408 selects a human agent that closely resembles the pseudo-agent, such as by work assignment engine 110. How closely the match must be is a matter of design choice. For example, a 16 year old female buying clothes may call contact center 102 expecting to speak to pseudo-agent 106B who is believed to be 18 years old. Work assignment engine 110 may access pseudo-agent profile 114 and thereby determine that a human agent may need to be younger than 22 years old in order for the facade to be believable. Contact center 102 accesses human agent profile 112 to determine candidate human agents 104 and route the call, via router 108 accordingly. However, contact center 102 may not have human agents 104 available who fit the profile. Therefore, work assignment engine 110 may select one of human agents 104 who are available, even if the human agent 104 selected is outside of the target age range.

The contact center may utilize a set of rules defining what is desirable and what is acceptable, depending on the volume of activity of the contact center. The contact center may also employ certain no-go rules, such as when a contact is trying to reach a pseudo-agent who is a female who has lived in the deep south all her life and, one would expect, speak with a southern drawl. A contact center whose only female agents are either much older or are natives from Boston, and speak with a Boston accent, may decline the contact. For example, the contact may be told, "I'm sorry, she's not in today, but (name of human or another pseudo-agent) is in and she would be glad to help you out," and cause work assignment engine 110 and/or router 108 to route the contact accordingly. Furthermore, if the same customer tries to reach the pseudo-agent within a certain time window, the human agent selected might have to be the same as the previous session as differences in speech and voice between different human agents 104 may be readily detected by the customer. If the same human agent isn't available, the contact may be instructed to try again later, or that someone else is available to assist them.

Step 410 provides the pseudo-agent's profile to the human agent and step 412 routes the call to the selected human agent, such as by work assignment engine 110 and/or router 108. Human agent 104 processing the contact may be scored by a human supervisor or an automated system, for example, looking for phrases like, "you don't sound like what I expected." Human agents 104 may then be acknowledged for impersonating the pseudo-agent well, or a number of pseudo-agents, or recommended for training for poorly impersonating the pseudo-agent. Similarly, a range features may be associated with a human agent, such as, "impersonates females 20-40 well, under 20 poorly, over 40 marginally."

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in step diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a step diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
accessing, by a processor, a customer profile with at least one customer attribute;
determining, by the processor, a preferred agent attribute in accord with the customer profile;
creating, by the processor, a pseudo-agent, having a pseudo-agent profile, on a social media website available to the customer, the pseudo-agent profile comprising a first pseudo-agent profile attribute;
setting, by the processor, the first pseudo-agent profile attribute in accord with the preferred agent attribute;
providing, by the processor, the pseudo-agent profile to a human agent; and
establishing, by the processor, an interaction between the customer and a human agent.

2. The method of claim 1, further comprising, providing an embellishment of the pseudo-agent profile in accord with the customer profile and wherein the embellishment is at least one of an addition of an entry to the pseudo-agent profile, modification of the pseudo-agent profile, a comment associated with an entry of the customer profile, and an endorsement of an entry of the customer profile.

3. The method of claim 2, wherein the embellishment is in accord with an activity associated with the customer profile.

4. The method of claim 2, wherein the embellishment is presented to a human agent for approval.

5. The method of claim 2, wherein the embellishment comprises a social media post.

6. The method of claim 5, wherein the social media post is selected from a database previously populated with a number of social media posts.

7. The method of claim 5, wherein the customer attribute is a mean time between customer postings to a social media website and wherein the social media post is provided after the passage of time from a previous social media post that is substantially equivalent to the mean time between customer postings.

8. The method of claim 1, further comprising:
accessing a plurality of the customer profiles; and
wherein the step of determining the preferred agent attribute further comprises determining the preferred agent attribute in accord with the plurality of customer profiles.

9. The method of claim 1, wherein the preferred agent attribute comprises a set of agent attributes.

10. The method of claim 1, further comprising:
determining the time since the customer profile was accessed; and
upon determining the time is greater than a threshold value, reaccessing the customer profile, identifying a change between the accessed customer profile and the reaccessed customer profile, determining the preferred agent attribute in accord with the reaccessed customer profile; and setting a second profile attribute in accord with the preferred agent attribute.

11. The method of claim 10, further comprising:
upon determining the second profile attribute contradicts the first profile attribute, negating the first profile attribute.

12. The method of claim 1, further comprising:
receiving a contact from the customer at a contact center; and
wherein the preferred agent attribute comprises an identifier of the pseudo-agent.

13. The method of claim 12, further comprising:
determining a communication session between the human agent and the customer has ended; and
in response to determining that the communication session has ended, prompting the human agent to update the pseudo-agent profile to include an artifact of the communication session.

14. A system, comprising:

a processor;

a database;

a network connection operable to connect the processor to a social media website; and wherein the processor is operable to access the database to retrieve a customer profile with at least one customer attribute, determine a preferred agent attribute in accord with the customer profile, create a pseudo-agent, having a pseudo-agent profile, on a social media website available to the customer, the pseudo-agent profile comprising a first pseudo-agent profile attribute; set the first pseudo-agent profile attribute in accord with the preferred agent attribute provide the pseudo-agent profile to a human agent; and establish, an interaction between the customer and a human agent.

15. The system of claim 14, further comprising, the processor being operable to access the social media website and embellish the pseudo-agent profile in accord with the customer profile and wherein the embellishment is at least one of an addition of an entry to the pseudo-agent profile, modification of the pseudo-agent profile, a comment associated with an entry of the customer profile, and an endorsement of an entry of the customer profile.

16. The system of claim 15, wherein the embellishment comprises a social media posting.

17. The system of claim 14, further comprising:

a work assignment engine connected to the network connection to receive a contact from the customer; and wherein the preferred agent attribute comprises an identifier of the pseudo-agent.

18. The system of claim 17, wherein the processor is further operable to determine the communication session has ended and prompt the agent to update the pseudo-agent profile to include an artifact of the communication session.

19. A non-transitory computer readable medium with instructions that, when read by a computer, cause the computer to perform the following method:

accessing a customer profile with at least one customer attribute;

determining a preferred agent attribute in accord with the customer profile;

creating a pseudo-agent, having a pseudo-agent profile, on a social media website available to the customer, the pseudo-agent profile comprising a first pseudo-agent profile attribute;

setting the first profile attribute in accord with the preferred agent attribute providing the pseudo-agent profile to a human agent; and establishing an interaction between the customer and a human agent.

20. The instructions of claim 19, wherein the computer further routes a contact to a human agent selected to impersonate the pseudo-agent.

* * * * *